(12) United States Patent
Kayser et al.

(10) Patent No.: US 12,300,029 B2
(45) Date of Patent: May 13, 2025

(54) ENHANCED IMAGE-BASED TRACKING IN CLINICAL ENVIRONMENTS

(71) Applicant: Hill-Rom Services, Inc., Batesville, IN (US)

(72) Inventors: Susan A. Kayser, Batesville, IN (US); Gene J. Wolfe, Pittsford, NY (US); David L Ribble, Indianapolis, IN (US); Olivia Gubitose Boyce, Cincinnati, OH (US); Craig M. Meyerson, Syracuse, NY (US)

(73) Assignee: Hill-Rom Services, Inc., Batesville, IN (US)

( * ) Notice: Subject to any disclaimer, the term of this patent is extended or adjusted under 35 U.S.C. 154(b) by 454 days.

(21) Appl. No.: 17/895,510

(22) Filed: Aug. 25, 2022

(65) Prior Publication Data

US 2023/0066803 A1 Mar. 2, 2023

Related U.S. Application Data

(60) Provisional application No. 63/237,507, filed on Aug. 26, 2021.

(51) Int. Cl.
*G06V 40/16* (2022.01)

(52) U.S. Cl.
CPC .......... *G06V 40/172* (2022.01); *G06V 40/171* (2022.01)

(58) Field of Classification Search
CPC ............................ G06V 40/171; G06V 40/172
USPC ........................................................ 382/118
See application file for complete search history.

(56) References Cited

U.S. PATENT DOCUMENTS

| | | |
|---|---|---|
| 9,235,977 B2 | 1/2016 | Deutsch |
| 9,767,554 B2 | 9/2017 | Chou et al. |
| 10,600,204 B1 | 3/2020 | Rush et al. |
| 10,765,563 B2 | 9/2020 | Dein |
| 10,910,103 B2 | 2/2021 | Venkataraman et al. |
| 10,943,682 B2 | 3/2021 | Wolf et al. |
| 10,956,492 B2 | 3/2021 | Barral et al. |
| 10,977,495 B2 | 4/2021 | Hares et al. |
| 11,048,918 B1* | 6/2021 | Catalano .................. H04Q 1/13 |
| 11,321,655 B2* | 5/2022 | Khan ................. G06Q 10/0639 |
| 2013/0113929 A1 | 5/2013 | DeLand |
| 2016/0065909 A1 | 3/2016 | Derenne et al. |
| 2017/0053543 A1 | 2/2017 | Agrawal et al. |
| 2019/0006047 A1 | 1/2019 | Gorek et al. |
| 2019/0362834 A1 | 11/2019 | Venkataraman et al. |
| 2020/0050844 A1 | 2/2020 | Kusens |
| 2020/0090805 A1* | 3/2020 | Bowers .................. G16H 10/60 |
| 2020/0226751 A1 | 7/2020 | Jin et al. |
| 2020/0302600 A1 | 9/2020 | Barral et al. |
| 2021/0068709 A1 | 3/2021 | Kusens |
| 2022/0087574 A1* | 3/2022 | Scanlin ................ G06V 10/454 |

(Continued)

FOREIGN PATENT DOCUMENTS

| | | |
|---|---|---|
| KR | 101587924 B1 | 1/2016 |
| WO | WO2014037938 A2 | 3/2014 |

*Primary Examiner* — Allen H Nguyen
(74) *Attorney, Agent, or Firm* — Lee & Hayes, P.C.

(57) ABSTRACT

An example method includes identifying images of an individual and determining, based on the images, a facial feature of the individual. The example method further includes determining a contextual feature of the individual. Based on the facial feature and the contextual feature, an identity of the individual is determined.

20 Claims, 9 Drawing Sheets

(56) References Cited

U.S. PATENT DOCUMENTS

2022/0342989 A1* 10/2022 Bunker ................ G06V 40/172
2022/0377091 A1* 11/2022 Christian ............ H04L 63/1416

* cited by examiner

ENHANCED IMAGE-BASED TRACKING IN CLINICAL ENVIRONMENTS

CROSS-REFERENCE TO RELATED APPLICATION

This application claims the priority of U.S. Provisional App. No. 63/237,507, which was filed on Aug. 26, 2021 and is incorporated by reference herein in its entirety.

TECHNICAL FIELD

This application relates generally to image-based recognition and tracking, particularly in clinical environments.

BACKGROUND

Location tracking is growingly important in complex environments that involve the movement and utilization of many different individuals and articles. For example, clinical environments, such as hospitals, have utilized a variety of technologies to track medical equipment as it is transferred between multiple patient rooms for different purposes. In addition, various entities have sought to track individuals, such as care providers, as they move throughout clinical environments. By tracking equipment and individuals, these entities can make informed decisions about equipment utilization and staffing.

Efforts have been made to use image recognition to perform location tracking. For example, entities have attempted to use facial recognition in order to identify and track individuals in clinical environments. However, these technologies have not been widely adopted due to their significant computing requirements and inaccuracies.

SUMMARY

Various implementations of the present disclosure relate to continuous, image-based monitoring of various subjects within a physical environment. According to some examples, individuals are specifically identified in images of the environment based on both facial and contextual features. In some particular cases, instruments and other equipment are tracked during a surgical procedure based on a video of the procedure.

Facial recognition can be used to identify individuals depicted in images. However, existing facial recognition techniques may inaccurately or improperly identify specific individuals. Although machine-learning-based techniques can enhance the accuracy of facial recognition, the achievement of these techniques may require a significant amount of processing power and/or latency in order to identify specific individuals. These drawbacks are particularly problematic for healthcare-related technologies that rely on accurate and rapid identification of individuals in order to address medical emergencies.

In various implementations of the present disclosure, identification techniques are enhanced by analyzing contextual features in addition to facial features. In some examples, a system may identify facial features of an individual in an image or video. These facial features, for instance, may include distances between different facial landmarks and/or ratios of those distances. However, the system may be unable to accurately distinguish the individual from other individuals that have similar facial features. Moreover, in particular clinical environments, many people utilize personal protective equipment (PPE) (e.g., face masks, face shields, etc.) and/or medical devices (e.g., oxygen masks, nasal cannula, etc.) that at least partially obscure their facial features, making facial recognition particularly challenging.

To accurately identify the individual, the system may identify one or more contextual features of the individual. In some cases, a contextual feature may be non-facial feature derived from the image or video. For instance, different classes of individuals within a clinical environment may wear different apparel. An individual wearing a white coat may be more likely to be a physician than a patient or other type of care provider. An individual wearing scrubs may be more likely to be a care provider than a patient or a visitor. An individual wearing a hospital gown is more likely to be a patient than a care provider or visitor. An individual attached to a medical device (e.g., an intravenous (IV) pole, a vital sign monitor, etc.) is more likely to be a patient than a care provider or visitor. In some cases, the system can specifically confirm the identity of a patient using a medical device by cross-referencing the electronic medical record (EMR) of the patient with the type of medical device depicted in the image or video. An individual wearing an identification badge is more likely to be a staff member of the clinical environment than a patient or a visitor. An individual wearing a temporary identification bracelet may be more likely to be a patient or visitor than a staff member. Based on these and other correlations, the system may be able to determine at least the class of the particular individual depicted in the image or video, and may therefore be able to more accurately identify the individual than using facial recognition alone.

In some implementations, the system may identify other types of contextual features of the individual. For example, the system may receive a signal from a real-time location system (RTLS) indicating that particular individual is present in a room monitored by the image or video. In some cases, the RTLS tracks the location of badges or other equipment utilized by the particular individual within the clinical environment. Accordingly, the system may be able to infer that at least one of the individuals within the room is the particular individual associated with the tracked equipment. Other information, like staff shift schedules and patient appointment schedules, can be used to identify individuals within the clinical environment.

In some cases, the system may further perform actions based on the identified individual. For instance, upon identifying that the individual is a patient, the system may monitor the individual for pain, a stroke, or some other medical condition. Based on identifying the condition of the patient, the system may notify care providers that the patient may need assistance and/or may automatically update an electronic medical record (EMR) of the patient.

In examples in which the individual is a care provider, the system may monitor the individual for workplace risks. For example, the system may identify if the individual is performing an unsafe lifting procedure and is at risk for a musculoskeletal injury. In some instances, the system may identify if the individual is being attacked or aggressed. The system may automatically notify the individual, safety officers, administrators, or any other individuals in order to mitigate risks to the care provider.

In various implementations, the system may track other types of subjects in the clinical environment. Care providers within the operating room may perform a manual "count" of the equipment during a surgical procedure, in order to prevent equipment from being accidentally left in the body cavity of the patient. However, when the care providers are unable to account for a particular piece of equipment, it may be difficult to distinguish whether that equipment was retained in the body cavity, misplaced, or removed from the operating room.

According to various examples of the present disclosure, the system analyzes a video of a surgical procedure and tracks equipment and individuals within the operating room. If a particular piece of equipment is unaccounted for, the system may display video clips of the equipment for the benefit of the care providers. Accordingly, the care providers may be able to identify the location of misplaced equipment and/or confirm that the equipment is retained in the body cavity of the patient. In some examples, the system is connected to a light within the operating room that selectively illuminates the equipment, such that the care providers can efficiently identify the retained equipment.

According to some examples, the system may further indicate individuals who have left the operating room during the procedure. These individuals, for example, may have carried the equipment out of the operating room. In some cases, the system specifically identifies the individuals for the benefit of the care providers, and can even provide contact information for the individuals to enable the care providers to contact the individuals and confirm the location of the missing equipment. Thus, the system can assist the care providers with root cause analysis of the missing equipment.

Various implementations described herein provide specific improvements to the technological field of image recognition. For example, by using contextual features, the system can more accurately identify the individuals. In various instances, by assisting care providers with counts of equipment during surgical procedures, the system can enhance patient safety by reducing the amount of time that patient body cavities are open during the counts.

DESCRIPTION OF THE FIGURES

The following figures, which form a part of this disclosure, are illustrative of described technology and are not meant to limit the scope of the claims in any manner.

DETAILED DESCRIPTION

Figure 1:
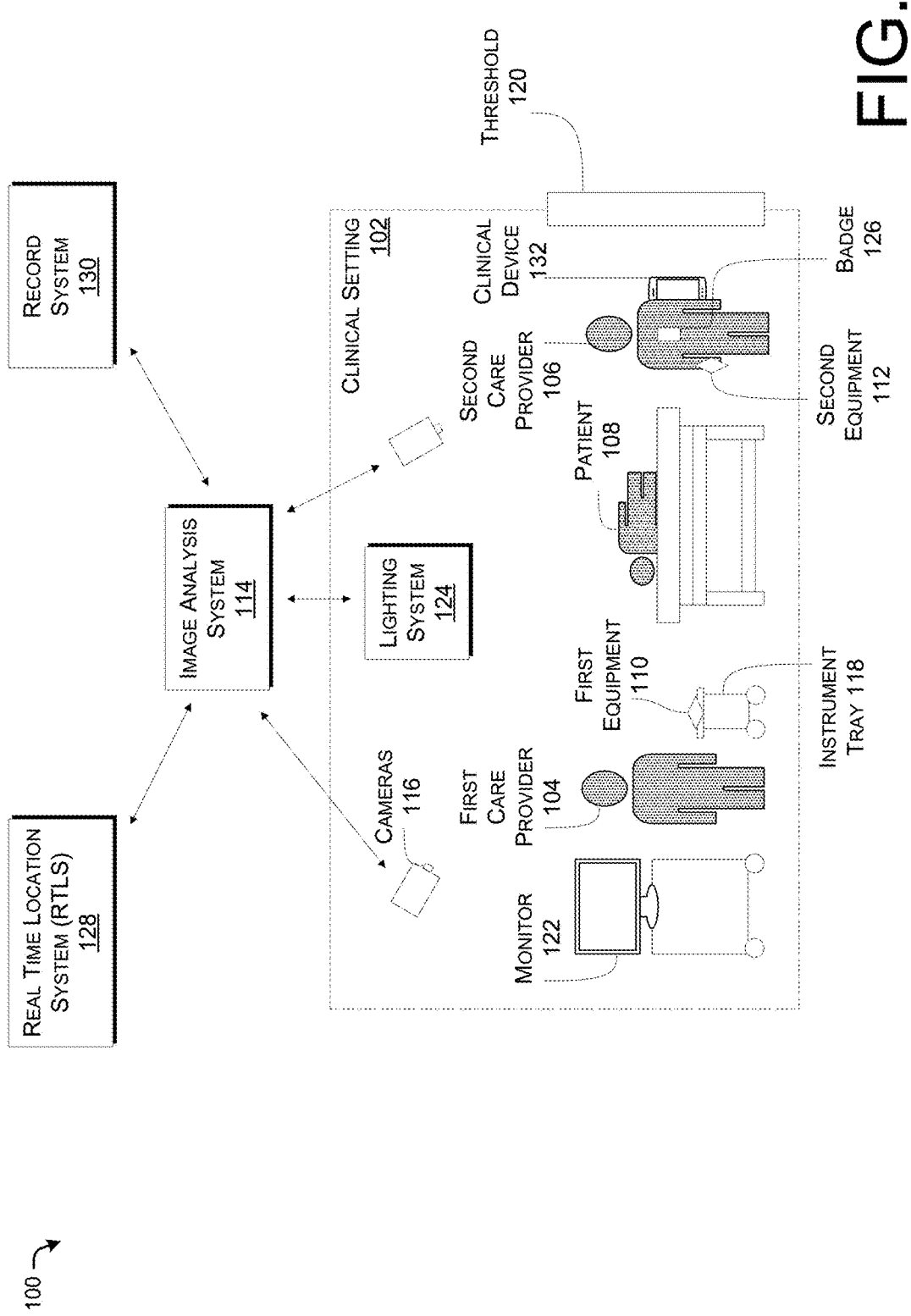
FIG. 1 illustrates an example environment for continuous tracking of subjects within a clinical setting.

Various implementations of the present disclosure will be described in detail with reference to the drawings, wherein like reference numerals present like parts and assemblies throughout the several views. Additionally, any samples set forth in this specification are not intended to be limiting and merely set forth some of the many possible implementations.

FIG. 1 illustrates an example environment 100 for continuous tracking of subjects within a clinical setting 102. As used herein, the term "subject," and its equivalents, can refer to a physical thing, an individual, or a part of a physical thing or individual. The clinical setting 102 may include at least a portion of one or more rooms within a clinical environment, such as a hospital, a hospice, a medical clinic, or the like. In various examples, the clinical setting 102 is an operating room.

The clinical setting 102 includes various subjects. Some of the subjects may be individuals. For example, the clinical setting 102 includes a first care provider 104 and a second care provider 106. The first care provider 104 or the second care provider 106 may be, for example, a nurse, a nursing assistant, a physician, a physician's assistant, a physical therapist, or some other authorized healthcare provider. In particular cases, the first care provider 104 and the second care provider 106 are part of a surgical team. For example, the surgical team may include at least one of a surgeon, an anesthesiologist, a nurse anesthetist, an operating room nurse, a circulating nurse, a surgical technician, a resident, a medical student, a physician assistant, a medical device representative, or any combination thereof.

The clinical setting 102 may further include other types of individuals, such as a patient 108. The patient 108 may be undergoing a surgical procedure. For example, the first care provider 104 or the second care provider 106 may perform the surgical procedure on the patient 108. In various implementations, the surgical procedure may include the insertion of equipment and/or manipulation of physiological structures within a body cavity of the patient 108. In some examples, the surgical procedure may involve the creation of at least one incision to provide physical access to the body cavity. At the conclusion of the surgical procedure, the first care provider or the second care provider 106 may close the body cavity by repairing the at least one incision.

In various implementations, non-human subjects are also disposed in the clinical setting 102. For instance, the clinical setting 102 may include first equipment 110 and second equipment 112. As used herein, the term "equipment," and its equivalents, may refer to a physical, non-living subject that is mobile. Examples of equipment include instruments, consumables (e.g., gauze, sutures, lap pads, sponges, towels, etc.), implants (e.g., artificial joints, bone screws, implantable pacemakers, etc.), devices (e.g., laparoscopic devices, ultrasound devices, etc.), and so on. As used herein, the term "instrument," and its equivalents, can refer to a subject that can be used as a tool. For example, the first equipment 110 or the second equipment 112 may include a surgical instrument, such as a scalpel, a clamp, scissors, a grasper, a retractor, a needle driver, a needle, a stapler, a dilator, a speculum, calipers, a ruler, a suction tip or tube, a lancet, a trocar, a saw, a drill, a laparoscopic camera, or any other type of instrument used in a surgical environment.

During the procedure, various equipment may enter the body cavity of the patient 108. For example, the first care provider 104 may temporarily insert a towel into the body cavity of the patient 108 in order to absorb a bodily fluid in the body cavity and to maintain visibility within the body cavity. Some types of equipment are intentionally retained in the body cavity. For example, the first care provider 104 may install a surgical screw into the femur of the patient 108 during the surgical procedure. However, other types of equipment are not intended to be retained in the body cavity. For the health and safety of the patient 108, it is important that non-implantable equipment is removed from the body cavity before the body cavity is closed. For example, unnecessary equipment retained in the body cavity of the patient 108 can cause physical damage to the patient 108, increases an infection risk of the patient 108, and can cause other devastating health consequences to the patient 108. As a result, care providers and clinical environments take substantial measures to prevent the possibility of equipment from being accidentally retained in the body cavities of patients.

In various cases, the first care provider 104 and the second care provider 106 may perform a count procedure in order to ensure that equipment within the clinical setting 102 is accounted for prior to closing the body cavity of the patient 108. In some cases, the first care provider 104 may maintain a list or log of all equipment brought into the clinical setting 102. Before closing the patient 108, the first care provider 104 may manually check that each piece of equipment on the list is accounted for. In some cases, the first care provider 104 may make sure that each piece of equipment is visually inspected by the first care provider 104 before checking it off the list. The first care provider 104 may prevent closure of the body cavity of the patient 108 until all equipment on the list is accounted for. Accordingly, the first care provider 104 may prevent equipment from unintentionally being retained in the body cavity of the patient 108 after the surgical procedure.

However, in some examples, a particular piece of equipment is difficult to find, even when it has not been retained in the body cavity of the patient 108. In some cases, the equipment may have been misplaced within the clinical setting 102. For example, a towel may have been accidentally dropped on the floor of the clinical setting 102 rather than in a waste bin. In some examples, the equipment may have been removed from the clinical setting 102. For example, an individual may have carried the equipment out of the clinical setting 102 before the procedure was concluded. In some cases, the equipment was added to the list but was never actually brought into the clinical setting 102. For instance, the list may indicate that five sponges were brought into the clinical setting 102, but only four sponges were in fact brought into the clinical setting 102. In any of these cases, the closure of the body cavity of the patient 108 may be delayed until the first care provider 104 can locate the missing equipment. In some implementations, the first care provider 104 or second care provider 106 physically explore the body cavity of the patient 108 in order to determine whether the missing equipment has been retained, which can cause physical harm to the patient 108.

To prevent delays in closing the body cavity, and to prevent unnecessary exploratory procedures of the body cavity of the patient 108, an image analysis system 114 may be configured to assist the first care provider 104 with the count. The image analysis system 114 may be communicatively coupled to cameras 116 disposed in the clinical setting 102. The cameras 116 may be configured to capture images and/or video of the clinical setting 102. For example, the cameras 116 may include a radar sensor, an infrared (IR) camera, a visible light camera, a depth-sensing camera, or any combination thereof. In various cases, each camera 116 includes one or more photosensors configured to detect light. For example, the photosensor(s) detect visible and/or IR light. In various implementations, the cameras 116 include further circuitry (e.g., an analog-to-digital converter (ADC), a processor, etc.) configured to generate digital data representative of the detected light. This digital data is an image, in various cases. As used herein, the term "image," and its equivalents, refers to a visual representation that includes multiple pixels or voxels. A "pixel" is a datum representative of a discrete area. A "voxel" is a datum representative of a discrete volume. A 2D image includes pixels defined in a first direction (e.g., a height) and a second direction (e.g., a width), for example. A 3D image includes voxels defined in a first direction (e.g., a height), a second direction (e.g., a width), and a third direction (e.g., a depth), for example. In various implementations, the cameras 116 are configured to capture a video including multiple images of the clinical setting 102, wherein the images can also be referred to as "frames." Although two cameras 116 are depicted in FIG. 1, implementations are not so limited. In some alternate implementations, the clinical setting 102 may include a single camera 116 or more than two cameras 116.

The cameras 116 may capture images and/or video of strategic positions within the clinical setting 102. For example, the cameras 116 may capture images and/or video of an instrument tray 118 configured to hold surgical instruments used during the surgical procedure. In some cases, the cameras 116 capture images and/or video of a waste receptacle, such as a biohazard disposal basket or a specimen tray within the clinical setting 102.

In various examples, the cameras 116 may capture images and/or video of a threshold 120 to the clinical setting 102. As used herein, the term "threshold," and its equivalents, may refer to a door, a window, or any other physical transition through which a subject can travel between spaces or rooms. The cameras 116 may therefore capture images and/or video of subjects (e.g., individuals or equipment) entering the clinical setting 102 and leaving the clinical setting 102.

In various cases, the cameras 116 provide the images and/or video of the clinical setting 102 to the image analysis system 114. The image analysis system 114 may be configured to evaluate the images and/or video. According to various implementations, the image analysis system 114 is configured to identify equipment depicted in the images and/or video. As used herein, the term "object," and its equivalents, may refer to a virtual representation of a physical subject within a digital image or video. For example, a subject is composed of atoms whereas an object is composed of pixels and/or voxels. In some implementations, the image analysis system 114 detects an object representing the equipment using edge detection. The imaging system 608, for example, detects one or more discontinuities in pixel and/or voxel brightness within an image. The one or more discontinuities may correspond to one or more edges of the discrete object representing the equipment in the image. To detect the edge(s) of the object, the image analysis system 114 may utilize one or more edge detection techniques, such as the Sobel method, the Canny method, the Prewitt method, the Roberts method, or a fuzzy logic method.

According to some examples, the image analysis system 114 identifies the detected object. For example, the image analysis system 114 identifies that the object represents the equipment (e.g., a scalpel) by performing image-based object recognition on the detected object. In some examples, the image analysis system 114 uses a non-neural approach to identify the detected object, such as the Viola-Jones object detection framework (e.g., based on Haar features), a scale-invariant feature transform (SIFT), or a histogram of oriented gradients (HOG) features. In various implementations, the image analysis system 114 uses a neural-network-based approach to identify the detected object, such as using a region proposal technique (e.g., R convolutional neural network (R-CNN) or fast R-CNN), a single shot multibox detector (SSD), a you only look once (YOLO) technique, a single-shot refinement neural network (RefineDet) technique, a retina-net, or a deformable convolutional network. The image analysis system 114 may store features of different classes of objects and/or neural networks for recognizing objects.

In some implementations, the image analysis system 114 detects a fiducial marking on the equipment and identifies the equipment based on the fiducial marking. For example, the equipment may be affixed with a sticker indicating a barcode (e.g., a QR code and/or ArUco code) identifying the equipment. In some implementations, the equipment displays the barcode on a screen.

In some cases, the image analysis system 114 is configured to track the locations of equipment depicted in the images and/or video. In various implementations, the image analysis system 114 tracks the object throughout the multiple images captured by the cameras 116. The image analysis system 114 may associate the object depicted in consecutive images captured by one of the cameras 116. In various cases, the object is representative of a 3D subject within the clinical setting, which can be translated within the clinical setting in 3 dimensions (e.g., an x-dimension, a y-dimension, and a z-dimension). The image analysis system 114 may infer that the subject has moved closer to, or farther away, from the camera 116 by determining that the object representing the subject has changed size in consecutive images. In various implementations, the image analysis system 114 may infer that the subject has moved in a direction that is parallel to a sensing face of the camera 116 by determining that the object representing the subject has changed position along the width or height dimensions of the images captured by the camera 116.

Further, because the subject is a 3D subject, the image analysis system 114 may also determine if the subject has changed shape and/or orientation with respect to the camera 116. For example, the image analysis system 114 may determine if the equipment been turned in the clinical setting 102. In various implementations, the image analysis system 114 utilizes affine transformation and/or homography to track the object throughout multiple images captured by the camera 116.

The image analysis system 114 may be configured to index equipment depicted in the images and/or video. In some cases, the image analysis system 114 may determine times at which example equipment appears in the image and/or video captured by the camera 116. The image analysis system 114 may store indications of those times. In addition, the image analysis system 114 may store the image and/or video. Accordingly, the image analysis system 114 may be configured to return clips depicting a specified piece of equipment, on demand.

The image analysis system 114 may be configured to identify, track, and index subjects continuously as the images and/or video is captured by the cameras 116. In various cases, the first care provider 104 may indicate, to the image analysis system 114, that a particular piece of equipment is unaccounted for. In some cases, the first care provider 104 indicates the missing equipment using a monitor 122. The monitor 122 may be a computing device. For example, the monitor 122 may be a computer, a laptop, a tablet computer, a vital sign monitor, a mobile phone, a smart television (TV), or any other device that includes a processor configured to perform various operations. In various implementations, the monitor 122 includes an input device configured to receive an input signal from the first care provider 104. Based on the input signal, the monitor 122 may transmit an indication of the missing equipment to the image analysis system 114.

In some examples, the first care provider 104 may be unable to account for the first equipment 110 or the second equipment 112. The first care provider 104 may indicate that the first equipment 110 and the second equipment 112 are missing via the monitor 122. For instance, the first care provider 104 may select indications of the first equipment 110 and the second equipment 112 from a drop-down menu displayed on the monitor 122, type in identifiers of the first equipment 110 and the second equipment 112 using a keyboard of the monitor 122, speak identifiers of the first equipment 110 and the second equipment 112 that are detected by a microphone of the monitor 122, or any combination thereof. The monitor 122 may transmit indications of the first equipment 110 and the second equipment 112 to the image analysis system 114.

The image analysis system 114 may generate information that can assist the first care provider 104 with locating the first equipment 110 and the second equipment 112. In some implementations, the image analysis system 114 identifies clips of the image and/or video depicting the first equipment 110 and the second equipment 112. For instance, the image analysis system 114 may refer to the index to identify times at which the first equipment 110 and/or the second equipment 112 were visible in the images and/or video captured by the cameras 116. In some cases, the image analysis system 114 returns one or more of the clips to the monitor 122 for display. For example, the image analysis system 114 returns a first clip indicating the last time that the first equipment 110 was observed in the clinical setting 102, and a second clip indicating the last time that the second equipment 112 was observed in the clinical setting 102. The monitor 122 may output the clips to the first care provider 104, which may assist the first care provider 104 with determining the current locations of the first equipment 110 and the second equipment 112. In some examples, the first care provider 104 may play, rewind, fast-forward, replay, or otherwise control playback of the clip(s). For instance, one of the clips may indicate that the first instrument 110 was most recently observed on the instrument tray 110, and the first care provider 104 may confirm the presence of the first equipment 110 by looking at the instrument tray 118. In some cases, one of the clips may indicate that the second equipment 112 was last observed entering the body cavity of the patient 108, which may indicate that the body cavity of the patient 108 should be explored in order to locate the second equipment 112.

In some cases, the image analysis system 114 may indicate the last-observed locations of the first equipment 110 and the second equipment 112. For example, the image analysis system 114 may determine that the second equipment 112 is being held by the second care provider 106 within the clinical setting 102. Based on receiving the indication that the second equipment 112 is missing or otherwise unaccounted for, the image analysis system 114 may determine the location of the second equipment 112 by analyzing the image and/or video and cause the monitor 122 to output an indication of the location of the second equipment. For instance, the monitor 122 may output a (visual and/or audible) message indicating that the second care provider 106 is holding the second equipment 112.

In some implementations, the image analysis system 114 controls a lighting system 124 to indicate the location of a missing piece of equipment. The lighting system 124, for example, includes one or more light sources configured to directionally output light. For example, the lighting system 124 includes one or more light-emitting diodes (LEDs). To indicate the location of missing equipment in the clinical setting 102, the image analysis system 114 may cause the lighting system 124 to selectively illuminate the location of the missing equipment. For instance, the image analysis system 114 may cause the lighting system 124 to illuminate the first equipment 110 on the instrument tray 118 based on the indication that the first equipment is unaccounted for.

The image analysis system 114 may perform any of the foregoing techniques to enable the first care provider 104 to visually confirm the presence of missing equipment within the clinical setting 102. However, in some cases, the equipment may have been removed from the clinical setting 102. In various implementations described herein, the image analysis system 114 may provide the first care provider 104 with information about the removal of the equipment from the clinical setting 102 by individuals.

According to some examples, the image analysis system 114 may further analyze the image and/or video from the cameras 116 for instances in which individuals have entered the clinical setting 102 via the threshold 120 and/or exited the clinical setting 102 via the threshold 120 during the surgical procedure. In some implementations, the image analysis system 114 may determine that the second care provider 106 left the clinical setting 102 by analyzing an image and/or video of the threshold 120 captured by the cameras 116 during the surgical procedure. In some cases, the image analysis system 114 may determine that the second care provider 106 was carrying the second equipment 112 when the second care provider 106 left the clinical setting 102. The image analysis system 114 may index the time that the second care provider 106 left the clinical setting 102.

Upon receiving an indication that that equipment is missing, the image analysis system 114 may cause the monitor 122 to indicate one or more individuals who have left the clinical setting 102 during the surgical procedure. In some examples, the image analysis system 114 may refer to the time that the second care provider 106 left the clinical setting 102 in order to obtain a clip of the image and/or video depicting the second care provider 106 leaving the clinical setting 102. For instance, the clip depicts a view of the threshold 120 within a time period (e.g., 5 seconds, 10 seconds, 30 seconds, etc.) before and after the second care provider 106 has left the clinical setting 102. The image analysis system 114, in some cases, may cause the monitor 122 to output the clip to the first care provider 104. Thus, the first care provider 104 may be able to observe whether the second care provider 106 carried the second equipment 112 out of the clinical setting 102.

In some implementations, the image analysis system 114 specifically determines identities of the individuals in the clinical setting 102, such as individuals who have entered and/or left the clinical setting 102. In particular cases, the image analysis system 114 may determine an identity of the second care provider 106 based on features of the second care provider 106. As used herein, the term "feature," and its equivalents, may refer to a characteristic that distinguishes a subject from another subject, such as a characteristic that distinguishes an individual from another individual. The image analysis system 114 may identify the features based, at least in part, on the image and/or video captured by the cameras 116.

In some cases, the image analysis system 114 may identify the second care provider 106 based, at least in part, on facial features of the second care provider 106. As used herein, the term "facial feature," and its equivalents, may refer to a visual characteristic of an individual's face. For example, the image analysis system 114 may determine a ratio between specific landmarks of the face of the second care provider 106, such a ratio of distances between the mouth, nose, eye, jawline, ears, forehead, cheeks, or other facial landmarks. In some cases, the image analysis system 114 may determine variances between the face of the second care provider 106 and a set of eigenfaces in order to recognize the second care provider 106. Other facial recognition techniques are possible, such as elastic bunch graph matching (e.g., using Fisherfaces), hidden Markov models, dynamic link matching, linear discriminant analysis, multi-linear subspace learning, or any combination thereof. Based on the image and/or video of the face of the second care provider 106, the image analysis system 114 may identify the second care provider 106. In various cases, the image analysis system 114 prestores or accesses prestored indications of various features of individuals.

In some implementations, the image analysis system 114 may identify the second care provider 106 based, at least in part, on contextual features of the second care provider 106. As used herein, the term "contextual feature," and its equivalents, may refer to a non-facial characteristic. In some cases, a contextual feature distinguishes class of individuals from another class of individuals. For example, a contextual feature of the second care provider 106 may indicate that the second care provider 106 is a medical student, rather than a nurse or a physician.

In various implementations, the image analysis system 114 may identify a badge 126 that is worn by and/or affixed to the second equipment 112. The image analysis system 114, in some cases, determines a class of the second care provider 106 and/or an identity of the second care provider 106 based on the badge 126. For example, the image analysis system 114 may identify a shape and/or color of the badge 126 that indicates the second care provider 106 is a physician, a resident, a medical student, a nurse, or some other type of care provider. In some examples, the image analysis system 114 determines an identifier of the second care provider 106 output on the badge 126. For instance, the badge 126 may display a name and/or ID number of the second care provider 106. The image analysis system 114 may recognize the identifier of the second care provider 106 in the image and/or video depicting the badge 126.

According to some examples, the image analysis system 114 may determine the class of the second care provider 106 based on something that the second care provider 106 is wearing. For example, the image analysis system 114 may determine that a color and/or shape of scrubs that the second care provider 106 is wearing indicates that the second care provider 106 is a visiting medical student, rather than a resident care provider. In some cases, the image analysis system 114 may determine that the second care provider 106 is wearing loupes or a headlamp, indicating that the second care provider 106 is a surgeon rather than a nurse or some other type of care provider.

In some examples, a contextual feature is derived from a type of data other than image data. For instance, the image analysis system 114 may be communicatively coupled to an RTLS 128 configured to track tags throughout the clinical setting 102 or a broader clinical environment. In some cases, the second care provider 106 is associated with a specific tag that is carried by and/or affixed to the second care provider 106. For example, the tag may be incorporated into the badge 126 of the second care provider 106. The RTLS 128 may include receivers within the clinical setting 102 configured to receive a wireless (e.g., electromagnetic) signal from the tag. Based on a discrepancy between the times at which the wireless signal is received by the respective receivers, the RTLS 128 may determine distances between the tag and the receivers, and therefore triangulate the position of the tag within the clinical setting 102. Furthermore, the wireless signal may encode a specific identifier of the tag, which may be associated with the second care provider 106. Accordingly, the RTLS 128 may determine that the second care provider 106 is located in the clinical setting 102. In some implementations, the RTLS 128 may indicate the location of the second care provider 106 to the image analysis system 114. Based on the location of the second care provider 106, the image analysis system 114 may identify the second care provider 106 in the image and/or video captured by the cameras 116.

In various cases, the image analysis system 114 may derive a contextual feature of the second care provider 106 based on information provided by a record system 130. The record system 130 may store various data indicating features, schedules, roles, and identities of various individuals in the clinical environment. In some cases, the record system 130 includes one or more databases that each store various entries. For example, the record system 130 may store an entry indicating the identity of the care providers assigned to the surgical procedure taking place in the clinical setting 102. The image analysis system 114 may access the entry and may identify the second care provider 106 among the care providers assigned to the surgical procedure. In some cases, the record system 130 includes one or more entries including the facial and/or contextual features of the second care provider 106. Accordingly, the image analysis system 114 may specifically determine an identifier (e.g., name, employee ID, role, ID picture, etc.) of the second care provider 106 by communicating with the record system 130.

In some implementations, the image analysis system 114 may cause the monitor 122 to output an identifier of the second care provider 106. For example, the image analysis system 114 may transmit a signal to the monitor 122 that causes the monitor 122 to output the name, ID, or role of the second care provider 106. In some implementations, the image analysis system 114 obtains contact information (e.g., a pager or phone number) of the second care provider 106, which may be stored in the record system 130. In some cases, the image analysis system 114 may cause the monitor 122 to output the contact information of the second care provider 106. Accordingly, the first care provider 104 may efficiently contact the second care provider 106 in order to confirm the location of the second equipment 112.

According to some cases, the image analysis system 114 may automatically transmit a notification to the second care provider 106. For example, the second care provider 106 may be associated with a clinical device 132, such as a mobile phone, tablet computer, or some other computing device. Based on determining that the second care provider 106 has left the clinical setting 102, and that equipment is missing or unaccounted for, the image analysis system 114 may transmit a message to the clinical device 132 indicating the missing equipment. Accordingly, the second care provider 106 may return to the clinical setting 102 or otherwise contact the first care provider 104 in order to confirm the location of the missing equipment.

Various components described with reference to FIG. 1 may be implemented by one or more computing devices, in hardware and/or software. For example, the image analysis system 114 may be implemented in one or more on-prem or remote servers that are communicatively coupled to other elements of the environment 100. Various elements may be configured to communicate via one or more communication networks. As used herein, the term "communication network," and its equivalents, may refer to one or more interfaces over which data can be transmitted and/or received. A communication network may include one or more wired interfaces (e.g., Ethernet, optical, or other wired interfaces), one or more wireless interfaces (e.g., BLUETOOTH; near field communication (NFC); Institute of Electrical and Electronics Engineers (IEEE)-based technologies, such as WI-FI; $3^{rd}$ Generation Partnership Project (3GPP)-based technologies, such as Long Term Evolution (LTE) and/or New Radio (NR); or any other wireless interfaces known in the art). In various implementations, data is transmitted over an example interface via one or more Internet Protocol (IP) data packets and/or User Datagram Protocol (UDP) datagrams.

Figure 2:
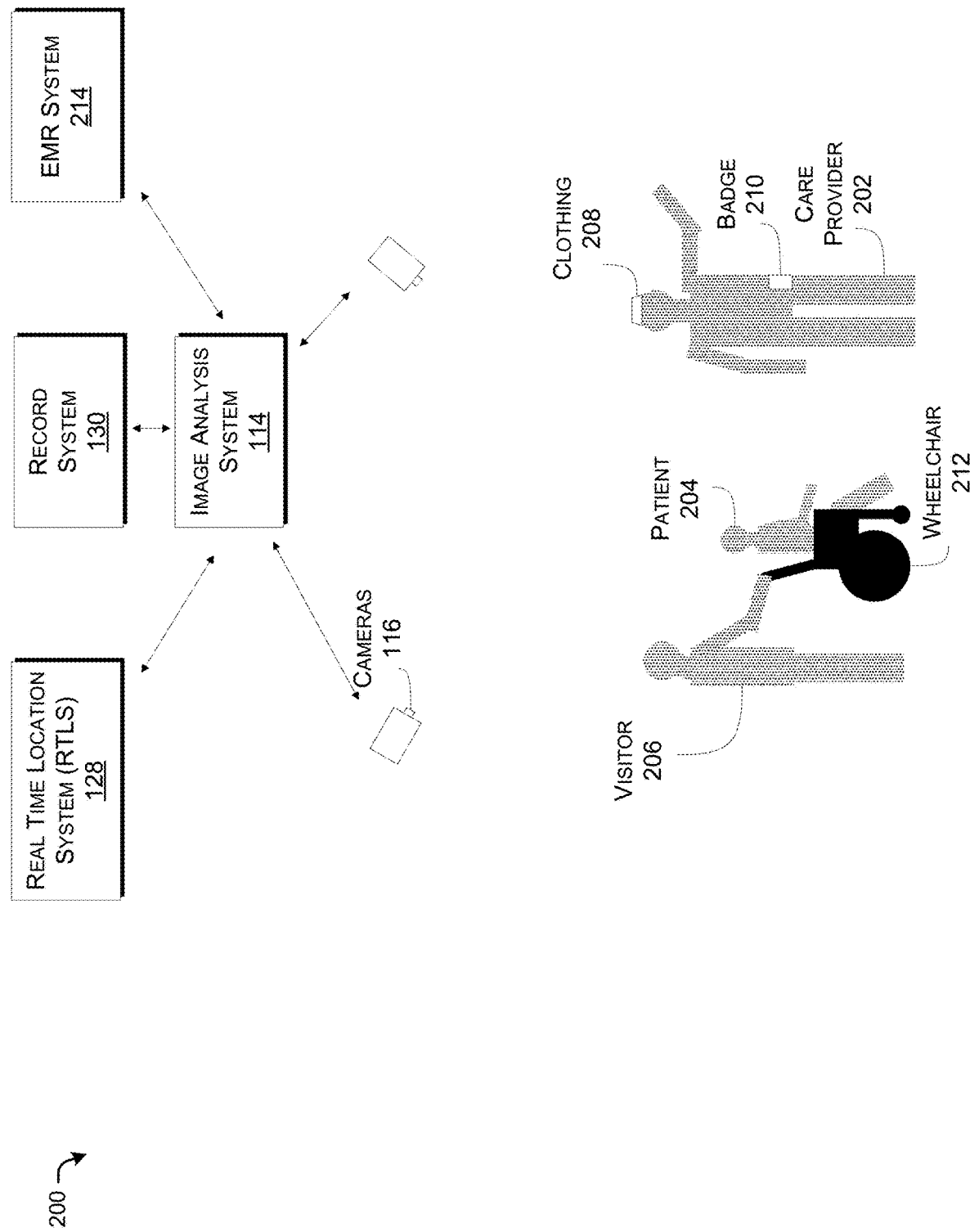
FIG. 2 illustrates an example environment for identifying various individuals within a clinical setting.

FIG. 2 illustrates an example environment 200 for identifying various individuals within a clinical setting. As shown, the example environment 200 includes the image analysis system 114, the cameras 116, the RTLS 128, and the record system 130 described above with reference to FIG. 1.

In particular cases, the image analysis system 114 may identify a care provider 202, a patient 204, and a visitor 206 within the clinical setting. For example, the image analysis system 114 may receive an image and/or a video from cameras 116 disposed in a clinical setting. In various cases, the image analysis system 114 may identify that there are three individuals depicted in the image and/or video. For example, the image analysis system 114 may identify objects in the image and/or video depicting the individuals by performing object recognition on the image and/or video.

Once the image analysis system 114 has recognized that the objects depict individuals, the image analysis system 114 may proceed to identify the care provider 202, the patient 204, and the visitor 206 based on the objects in the image and/or video representing the care provider 202, the patient 204, and the visitor 206.

In some implementations, the image analysis system 114 identifies the care provider 202, the patient 204, and the visitor 206 based on facial recognition. For example, the image analysis system 114 recognizes one or more facial characteristics (e.g., facial structures) based on the objects representing the care provider 202, the patient 204, and the visitor 206. Examples of facial characteristics include eyes, eyebrows, pupils, a forehead, a nose, a mouth, ears, a jaw, birthmarks, scars, and cheekbones. In various instances, the image analysis system 114 identifies one or more facial features of each individual based on the facial characteristic(s). Examples of facial features include dimensions (e.g., widths, heights, depths, curvatures, etc.) of individual facial characteristics, distances between facial characteristics, as well as ratios of dimensions and/or distances between facial characteristics. According to some cases, the image analysis system 114 may compare the face of each individual to a set of Eigenfaces, wherein metrics comparing each face to the set of Eigenfaces represent facial features. In some implementations, an example facial feature includes an image representing the image of the face of an individual.

Based at least in part on the facial features, the image analysis system 114 may identify at least one of the care provider 202, the patient 204, or the visitor 206. In various implementations, the record system 130 stores indications of facial features associated with various individuals that may traverse the clinical environment. For example, the record system 130 includes entries respectively storing identities and facial features of the care provider 202, the patient 204, and the visitor 206. The image analysis system 114 may extract the identities of the care provider 202, the patient 204, and the visitor 206 by searching the entries of the record system 130 for the identified facial features.

In some cases, the image analysis system 114 utilizes machine learning techniques to identify the care provider 202, the patient 204, and the visitor 206. For example, the image analysis system 114 may store a computer model including one or more CNNs configured to receive the facial features as inputs and provide the identities of the care provider 202, the patient 204, and the visitor 206 as outputs. The CNNs may be pre-trained, for example.

However, in some examples, facial features are insufficient to accurately identify the care provider 202, the patient 204, and the visitor 206. For example, the care provider 202 may be wearing a face mask or other PPE that impedes the image analysis system 114 from identifying facial features of the care provider 202 in the image and/or video. In some cases, the record system 130 may exclusively store data associated with care providers and/or patients, and thus the image analysis system 114 may be unable to identify the visitor 206 using various facial recognition techniques described herein.

In various implementations, the image analysis system 114 may identify the care provider 202, the patient 204, and the visitor 206 based on contextual features of the individuals. In some cases, the image analysis system 114 determines contextual features based on the image and/or video. For instance, the image analysis system 114 may recognize clothing 208 of the care provider 202 by analyzing the image and/or video. Any of the image processing techniques described herein can be used to identify the clothing 208 in the image and/or video. The image analysis system 114 may determine a class of the care provider 202 based on the clothing 208. For example, the image analysis system 114 may determine that a type of the clothing 208 is exclusively worn by clinical providers in the clinical environment. In some cases, the image analysis system 114 may determine that the type of the clothing 208 is exclusively worn by a certain type of clinical providers in the clinical environment. For instance, scrubs and/or white coats may be exclusively worn by clinical providers in the clinical environment. Further, nurses may wear a different scrub color than physicians in the clinical environment. In some examples, scrub caps, loupes, or headlamps are exclusively worn by surgeons in the clinical environment. Indications of these correlations can be stored in the image analysis system 114, for instance. Accordingly, the image analysis system 114 may determine that the care provider 202 is not a patient or visitor.

In some examples, the image analysis system 114 may identify a badge 210 of the care provider 202 by analyzing the image and/or video. Any of the image processing techniques described herein can be used to identify the badge 210 in the image and/or video. The image analysis system 114 may identify the care provider 202 based on the badge 210. For example, the identity of the care provider 202 may be printed on the badge 210, and the image analysis system 114 may recognize the identity using text recognition. In some cases, a color and/or shape of the badge 210 indicates that the care provider 202 is a clinical provider and not a patient 204 or a visitor 206. In some instances, the color and/or shape of the badge 210 indicates the type of clinical provider the care provider 202 is. For instance, a red shape on the badge 210 may indicate that the care provider 202 is a nurse, a purple shape on the badge 210 may indicate that the care provider 202 is a medical student, and a green shape on the badge 210 may indicate that the care provider 202 is a physician. Any of the badge-related characteristics described herein can be examples of contextual features of the care provider 202.

In some implementations, the image analysis system 114 determines contextual features from non-image sources. For example, the RTLS 128 may be configured to determine a location of a tag affixed or integrated with the badge 210. Further, the RTLS 128 may determine an identity of the care provider 202 that is associated with the badge 210. In various examples, the RTLS 128 provides a signal to the image analysis system 114 indicating the location and identity of the care provider 202. The image analysis system 114 may store an indication of the location of the cameras 116 in the clinical environment. Based on this information, the image analysis system 114 may identify the care provider 202 in the environment depicted in the image and/or video. Similar techniques can be used to track other items and/or individuals in the clinical environment, such as a medical device or hospital bed associated with a particular patient, a wristband worn by a visitor, or the like.

According to various cases, the image analysis system 114 may determine the identities of the care provider 202, patient 204, and visitor 206 based on a schedule stored by the record system 130. For example, the schedule may indicate a shift of the care provider 202 (and other care providers) in the clinical environment, patients assigned to the care provider 202, procedures scheduled to be performed by the care provider 202, and the like. In addition, the schedule may indicate an appointment of the patient 204 in the clinical environment, a room assigned to the patient 204, a procedure scheduled to be performed on the patient 204, and so on. By communicating with the record system 130, the image analysis system 114 can infer that the individuals recognized in the image and/or video may correspond to care provider 202, the patient 204, and the visitor 206 indicated in the schedule as assigned to that environment at the particular time.

In some cases, the image analysis system 114 determines contextual features from mixed image and non-image sources. For example, the image analysis system 114 may identify a wheelchair 212 used by the patient 204. In various instances, the image analysis system 114 can identify any of a variety of medical devices or equipment used by the patient 204, such as a support structure (e.g., a hospital bed or gurney), a vital sign monitor, a biological sensor, a ventilator, a heart monitor (e.g., a Holter monitor), a feeding tube, an EEG device, an oxygen tank, a nasal cannula, a walker, a blood pressure cuff, an EEG electrode, a spirometer, a medical imaging device, a cast, a brace, crutches, or any other type of medical device or equipment. In some cases, the image analysis system 114 may infer that the patient 204 is not a care provider based on the use of the wheelchair 212 or other equipment. Furthermore, the image analysis system 114 may specifically identify the patient 204 by communicating with an EMR system 214. According to various implementations, the EMR system 214 stores EMR data indicative of various patients, such as the patient 204. In some cases, the image analysis system 114 receives EMR data from the EMR system 214. The EMR data indicates that the patient 204 uses the wheelchair 212 or other equipment as well as an identity of the patient 204. Accordingly, the image analysis system 114 may identify the patient 204 based on their medical record.

The image analysis system 114 may perform one or more actions based on identifying the care provider 202, the patient 204, and the visitor 206. For instance, the image analysis system 114 may store indications of the locations of the care provider 202, the patient 204, and the visitor 206 in the record system 130. According to various implementations, the image analysis system 114 may further identify conditions of the individuals based on their facial expressions. As used herein, the term "facial expression," and its equivalents, may refer to a motion and/or position of a facial characteristic or a combination of facial characteristics. By tracking the facial characteristics of the individuals in the image and/or video, the image analysis system 114 may determine whether the facial characteristics match any predetermined facial expressions.

For instance, the image analysis system 114 may determine whether the care provider 202 has a facial expression associated with physical straining or pain. In clinical environments, care providers are susceptible to lifting and/or repetitive use injuries by caring for patients and conducting clinical duties. For example, a nurse mobilizing a patient may be susceptible to a lifting injury. In various implementations of the present disclosure, the image analysis system 114 may determine that the care provider 202 is at risk for injury based on the facial expression of the care provider 202. For instance, the image analysis system 114 may determine that an eyebrow of the care provider 202 has lowered, an eye of the care provider 202 has closed and/or tightened, a nose of the care provider 202 has wrinkled, an upper lip of the care provider 202 has raised, or any combination thereof. In some implementations, these characteristics are also consistent with the care provider 202 suffering a violent attack from other individuals, which can also cause physical harm to the care provider 202. In various cases, the image analysis system 114 may determine whether an individual has a facial expression associated with anger (e.g., eyebrows lowered, upper or lower eyelids raised tightened lips, lip corners rolled in, etc.) or happiness (e.g., smiling). For example, the image analysis system 114 may generate an alert if the individual is angry and potentially ready to act violently, or may store an indication that the individual is happy for patient or employee satisfaction purposes. The image analysis system 114 may use any image processing technique described herein to identify the facial expression of the care provider 202.

Upon recognizing that the care provider 202 has a facial expression associated with physical straining or pain, the image analysis system 114 may perform one or more actions. For instance, the image analysis system 114 may transmit an alert to a clinical device associated with the care provider 202 notifying the care provider 202 of their heightened risk for injury. According to some cases, the alert may further instruct the care provider 202 to rest or to take advantage of other assistance (e.g., an assistive patient lift device) that can prevent injury to the care provider 202. In some cases, the image analysis system 114 transmits an alert to another computing device that informs an administrator of the heightened risk for injury to the care provider 202.

In some examples, the image analysis system 114 may determine whether the patient 204 has a facial expression associated with stroke. For instance, the image analysis system 114 may detect movement of facial characteristics on one portion (e.g., half) of the face of the patient 204 and detect an absence of movement of facial characteristics on another portion (e.g., half) of the face of the patient 204. Upon identifying the facial expression consistent with stroke, the image analysis system 114 may transmit an alert to a clinical device associated with a care provider (e.g., the care provider 202) instructing the care provider to provide assistance and/or treatment to the patient 204. In some cases, the image analysis system 114 may store an indication of the identified stroke in an EMR of the patient 204 maintained by the EMR system 214.

According to some implementations, the image analysis system 114 may perform other types of analyses in order to identify a stroke. For example, the image analysis system 114 may track a movement of the visitor 206 over time. The movement, for example, may be movement through the clinical environment, such as walking. In some cases, the image analysis system 114 may infer that the visitor 206 has had a stroke by determining that a gait of the visitor 206 has changed and/or is uneven. Based on inferring the stroke of the visitor 206, the image analysis system 114 may transmit an alert to a clinical device instructing a care provider to provide assistance to the visitor 206. Thus, the image analysis system 114 may determine the condition of an individual in the clinical environment based on movement of the individual in the clinical environment.

In some cases, the image analysis system 114 may determine whether individuals are improperly wearing PPE based on the images captured by the camera 116. For example, the image analysis system 114 may determine whether the care provider 202 is wearing a mask or respirator incorrectly (e.g., exposing the nose of the care provider 202), or whether the care provider 202 is not wearing PPE that is appropriate for the location of the care provider 202 (e.g., the care provider 202 is not wearing a mask in a room of a patient with tuberculosis). The image analysis system 114, in some cases, generates an alert or report indicating the improper PPE usage by the care provider 202. In some implementations, the image analysis system 114 outputs the alert or report to a clinical device associated with the care provider 202 and/or an administrator responsible for implementing safety policies in the environment 200.

Figure 3:
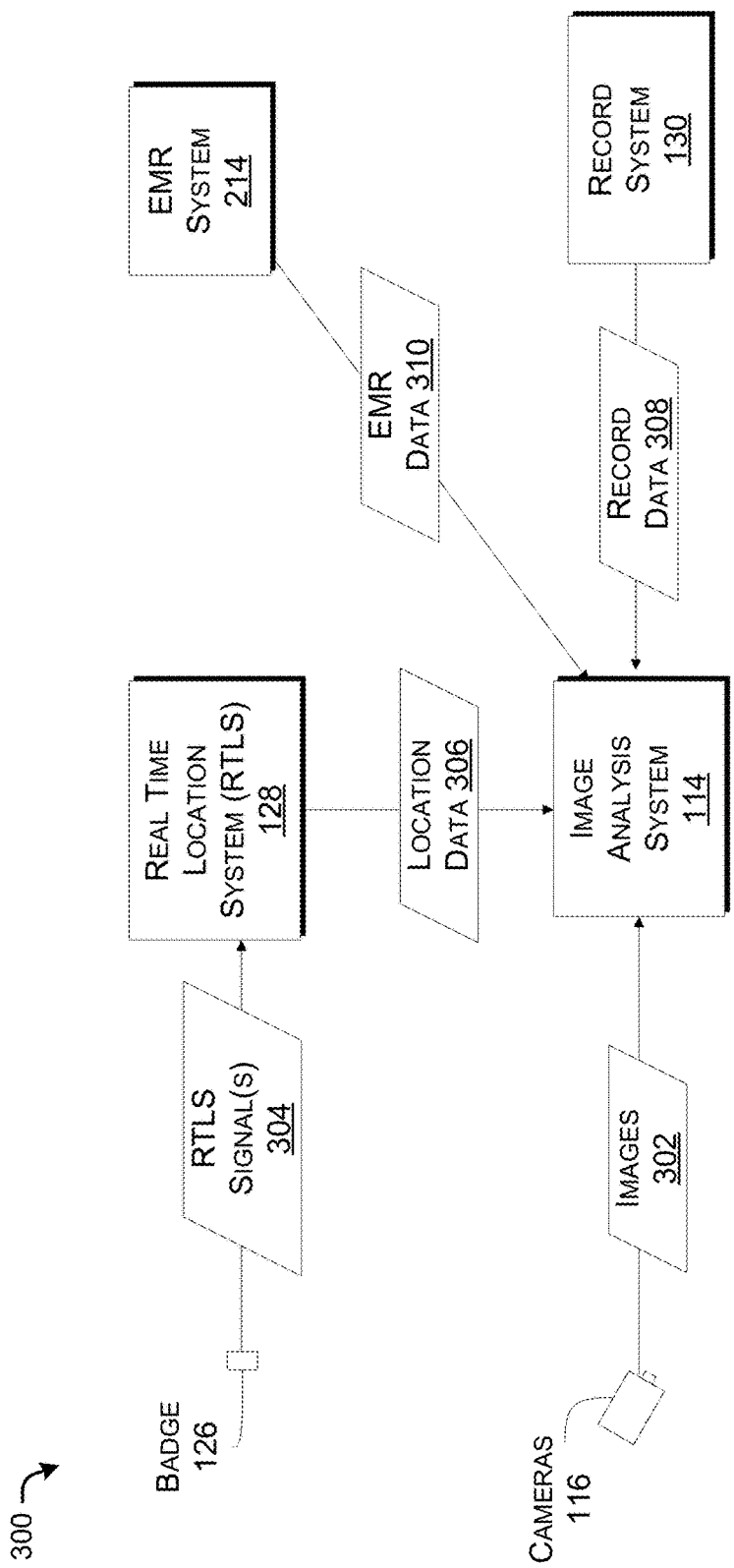
FIG. 3 illustrates example signaling for identifying a subject in a clinical environment.

FIG. 3 illustrates example signaling 300 for identifying a subject in a clinical environment. The signaling 300, for example, is between the image analysis system 114, the cameras 116, the badge 126, the RTLS 128, the record system 130, and the EMR system 214 described above with reference to FIGS. 1 and 2.

The cameras 116 may capture images 302 of a clinical environment and may provide the images 302 to the image analysis system 114. The image analysis system 114 may analyze the images 302 using any of the various image processing techniques described herein. In some cases, the image analysis system 114 identifies objects in the images 302 that are representative of subjects in the clinical environment. The subjects, for example, include equipment, instruments, individuals, or any portion thereof. Further, the image analysis system 114 may recognize the subjects based on the images 302.

In some implementations, the image analysis system 114 may identify the types and/or identities of the subjects in the images 302 based on analyzing the images 302. For example, the image analysis system 114 may identify individuals depicted in the images 302 by identifying facial and/or contextual features of the individuals, based on the images 302. In some cases, the image analysis system 114 may identify badges, medical devices, clothing, or other items carried by or utilized by the individuals and may identify the individuals based on those items. In some cases, the image analysis system 114 may identify equipment depicted in the images 302 by determining a shape of equipment depicted in the images 302 is consistent with a predetermined equipment shape.

In some cases, the image analysis system 114 may identify the types and/or identities of the subjects in the images 302 based on other sources of data. In some implementations, a badge 126 associated with an individual depicted in the images 302 transmits one or more RTLS signals to the RTLS 128. For example, the RTLS 128 may include multiple receivers disposed at various locations in the clinical environment that receive an individual RTLS signal 304. The RTLS signal(s) 304, for example, are wireless (e.g., radio-frequency) signals broadcasted by the badge 126. In some cases, the RTLS signal(s) 304 indicate an identifier of the badge 126. The transmission speed of the RTLS signal(s) 304 may be predetermined. Accordingly, the RTLS 128 may determine the time discrepancies at which each RTLS signal 304 is received by the receivers, determine distances between the receivers and the badge 126 based on the time discrepancies, and locate the badge 126 using triangulation. In various cases, the RTLS 128 may transmit location data 306 to the image analysis system 114. The location data 306 may indicate the location of the badge 126 and/or an identity of the individual associated with the badge 126. If the location of the badge 126 is within the setting monitored by the images 302, then the image analysis system 114 may infer that an individual depicted in the images 302 is the individual associated with the badge 126.

In some examples, the record system 130 stores a schedule indicating planned locations of care providers and patients within the clinical environment at various times. The record system 130 may transmit record data 308 indicating at least a portion of the schedule to the image analysis system 114. The image analysis system 114 may identify individuals depicted in the images 302 based on the record data 308. For example, the image analysis system 114 may infer that a care provider or patient scheduled to be in a particular room at a particular time is depicted in the images 302 of the room that were captured at the particular time.

In some cases, the EMR system 214 stores EMRs of individuals cared for by the clinical environment. The EMR system 214 may transmit EMR data 310 to the image analysis system 114. The image analysis system 114 may identify individuals depicted in the images 302 based on the EMR data 310. For instance, the image analysis system 114 can identify an individual using medical equipment (e.g., a wheelchair) in the images 302, determine that the medical equipment is prescribed to a particular patient indicated in the EMR data 310, and may conclude that the individual is the particular patient.

Figure 4:
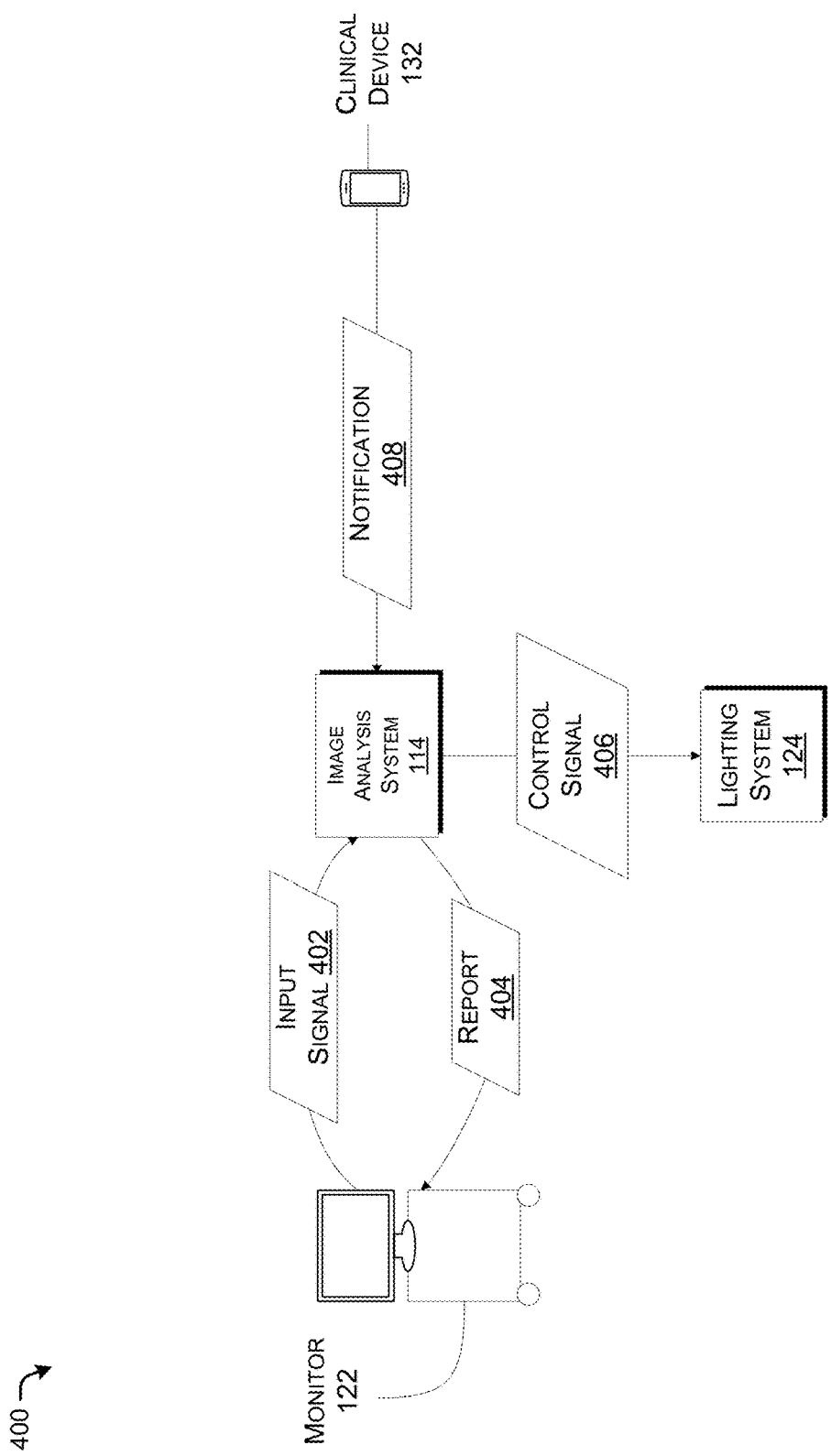
FIG. 4 illustrates example signaling for reporting the location of a detected subject in a clinical environment.

FIG. 4 illustrates example signaling 400 for reporting the location of a detected subject in a clinical environment. The example signaling 400 is between the image analysis system 114, the monitor 122, the lighting system 124, and the clinical device 132 described above with reference to FIG. 1.

In various implementations, the image analysis system 114 tracks equipment in the clinical setting. In some cases, the image analysis system 114 stores or otherwise maintains an index or log indicating times and/or locations of the equipment over time. In addition, the image analysis system 114 may further store images and/or video of the equipment captured over time.

A monitor 122 may transmit an input signal 402 to the image analysis system 114. The input signal 402 may be initiated by a user, such as a care provider, who has identified missing equipment. For example, the care provider may determine that a scalpel brought into an operating room is unaccounted for at the end of a surgical procedure performed in the operating room. The input signal 402 may identify the missing equipment.

Based on the input signal 402, the image analysis system 114 may assist the user with locating the missing equipment. In some implementations, the image analysis system 114 generates a report 404 and transmits the report 404 to the monitor 122. The report 404 may indicate the location of the missing equipment. For instance, the image analysis system 114 may provide the last-known location of the missing equipment in the clinical setting. In some implementations, the report 404 includes one or more image and/or video clips depicting the missing equipment, such as a clip indicating the last interval at which the image analysis system 114 identified the missing equipment in the stored images and/or video. By viewing the clip(s) provided by the report 404 on the monitor 122, the user may be able to locate the missing equipment.

According to some examples, the image analysis system 114 further tracks individuals that enter and leave the clinical setting during the procedure. The image analysis system 114, for example, stores indications of the identities of each individual in the clinical setting during the procedure and times at which the enter and leave the clinical setting. Because the missing equipment may have been carried out of the clinical setting by an individual, the report 404 may further indicate individuals who have left the clinical setting (e.g., since the missing equipment was last recognized by the image analysis system 114 in the clinical setting). For instance, the report 404 may include image and/or video clips of the individuals leaving the clinical setting. Thus, the user may be able to locate the missing equipment by contacting the individuals who have left the clinical setting and may have carried the missing equipment out of the clinical setting.

In some implementations, the image analysis system 114 may output a control signal 406 to the lighting system 124 based on the input signal 402. The control signal 406 may cause the lighting system 124 to selectively illuminate the location of the missing equipment in the clinical setting. Thus, the user can locate the missing equipment by noticing the illumination in the clinical setting.

According to some instances, the image analysis system 114 may transmit a notification 408 to the clinical device 132. In various cases, the clinical device 132 may be associated with an individual who has left the clinical setting during the procedure. The notification 408, for example, may include an instruction to contact the user of the monitor 122 about the missing equipment, an indication of the missing equipment, an instruction to return to the clinical setting, or the like. Accordingly, the individual who may have inadvertently removed the missing equipment from the clinical setting may be contacted.

Figure 5:
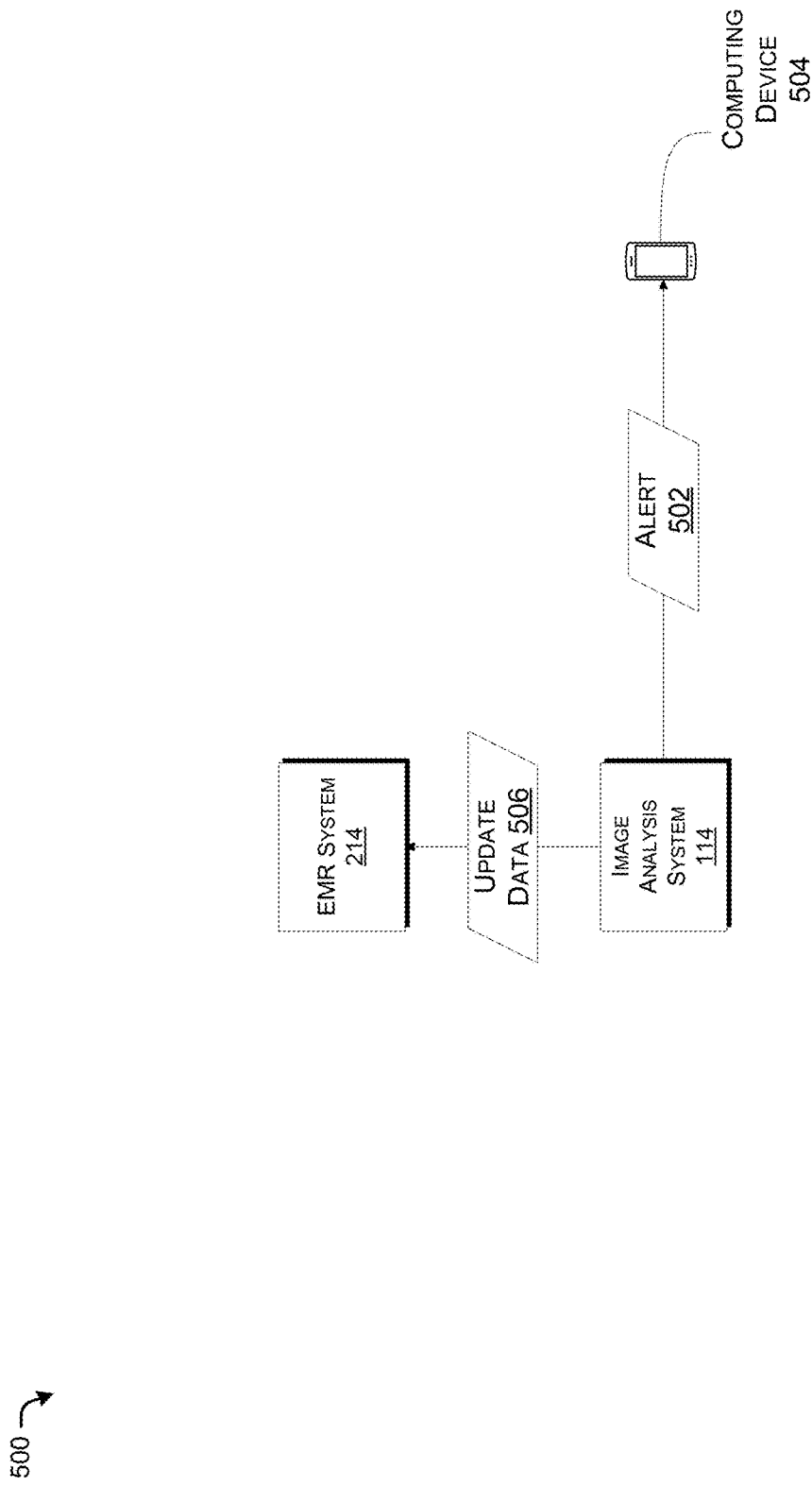
FIG. 5 illustrates example signaling for taking action upon identifying the condition of an individual in a clinical environment.

FIG. 5 illustrates example signaling 500 for taking action upon identifying the condition of an individual in a clinical environment. The signaling 500 is between the image analysis system 114 and the EMR system 214 described above with reference to FIGS. 1 and 2.

In various implementations, the image analysis system 114 may determine a condition of an individual. For instance, the image analysis system 114 may determine that an individual is physically straining, is in pain, is being attacked, or is having a stroke. Various techniques for identifying these conditions are described throughout this disclosure.

According to some examples, the image analysis system 114 may generate an alert 502 based on the identified condition. The alert 502, for example, may specify an identity of the individual, a location of the individual, and an indication of the condition of the individual. The image analysis system 114 may transmit the alert 502 to a computing device 504. For example, the computing device 504 may be a clinical device associated with a care provider or a security guard. The alert 502, in various cases, may further include an instruction to provide assistance to the individual based on the condition.

In some cases, the image analysis system 114 may update the EMR of the individual based on the identified condition. For instance, the image analysis system 114 may generate update data 506 indicating the condition and transmit the update data 506 to the EMR system 214. The update data 506 may specify the individual and the condition. In turn, the EMR system 214 may update the EMR of the individual based on the update data 506.

Figure 6:
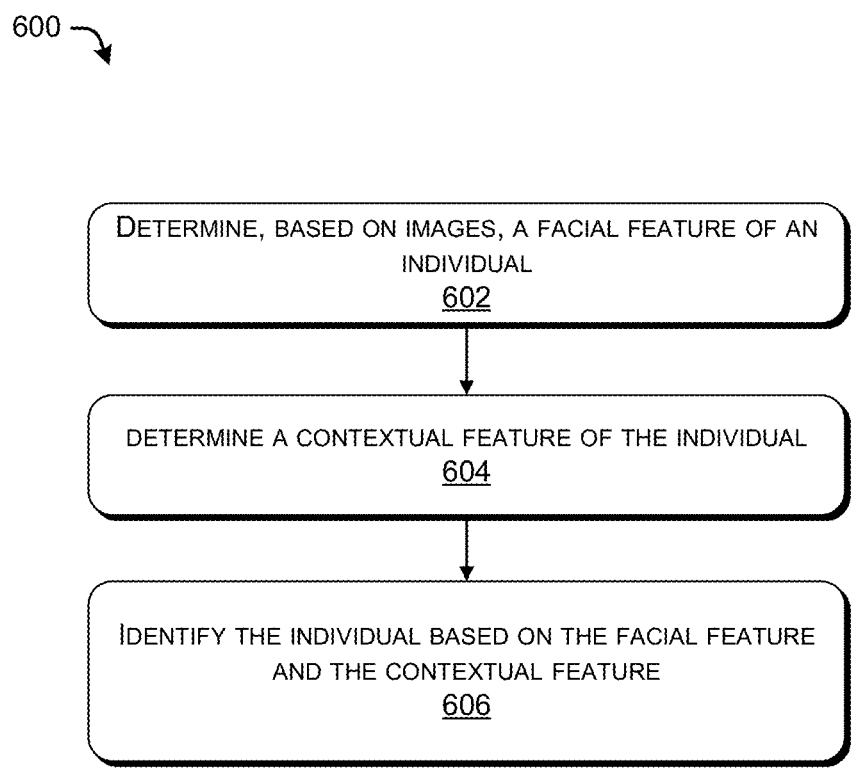
FIG. 6 illustrates an example process for identifying an individual.

FIG. 6 illustrates an example process 600 for identifying an individual. The example process 600 is performed by an entity including, for example, the image analysis system 114, a processor, and/or a computing device.

At 602, the entity determines, based on images, a facial feature of an individual. The facial feature, for example, may be c at least one of a variance between the face of the individual and a set of eigenfaces, a first distance between facial characteristics on the face of the individual, or a ratio of the first distance and a second distance between the facial characteristics on the face of the individual. In some implementations, the entity stores a CNN and uses the CNN to determine the facial feature of the individual.

At 604, the entity determines a contextual feature of the individual. Various contextual features may be determined based on the images. For example, the contextual feature may be apparel of the individual, such as a gown worn by the individual, a coat worn by the individual, or the like. In some cases, the contextual feature is based on a badge worn by the individual or a temporary ID bracelet (or other tag) worn by the individual. In some cases, the contextual feature may be equipment used by the individual, such as a headlamp worn by the individual, loupes worn by the individual, PPE worn by the individual, a medical device used by the individual, a cast worn by the individual, or other equipment utilized by the individual. In some cases, the contextual feature is based on a time and/or location at which the individual is observed. For instance, an RTLS may identify a location of a badge or ID bracelet associated with the individual.

At 606, the entity identifies the individual based on the facial feature and the contextual feature. According to some implementations, the entity stores and/or accesses a database storing indications of facial and/or contextual features of multiple individuals in the environment. The entity may identify the individual by identifying an entry of the database storing the identified facial feature and the contextual feature. For instance, the entry may indicate a schedule of various individuals, and my identify the individual because the schedule of the individual matches the time and/or location at which the individual is observed. In some implementations, the entity may identify the individual by matching the EMR of the individual to equipment used by the individual. The entry may include an identifier of the individual, such as a name of the individual, a role of the individual (e.g., whether the individual is a patient or a specific type of care provider), contact information of the individual, or any combination thereof.

Figure 7:
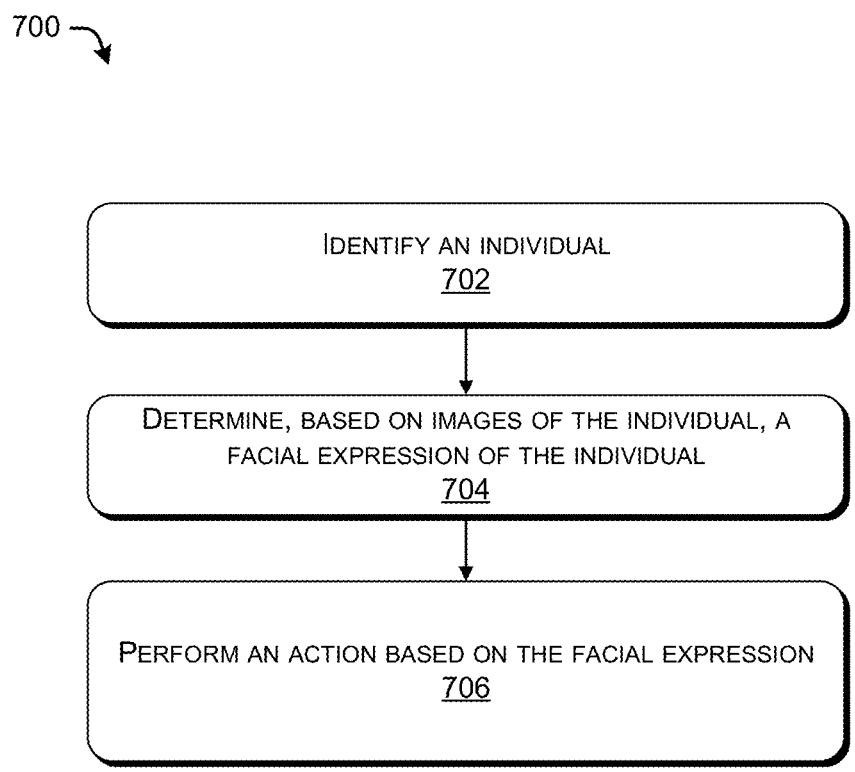
FIG. 7 illustrates an example process for automatically performing actions based on the facial expression of an individual.

FIG. 7 illustrates an example process 700 for automatically performing actions based on the facial expression of an individual. The example process 700 is performed by an entity including, for example, the image analysis system 114, a processor, and/or a computing device.

At 702, the entity identifies an individual. In various implementations, the entity may identify the individual based on facial and/or contextual features of the individual. The features may be detected using image processing techniques on images of the individual. In some cases, an RTLS detects the location of the individual at a particular time, and the individual can be identified by matching the location of the individual at the particular time to stored schedules of multiple individuals. In some implementations, the individual is identified using facial recognition techniques. In some cases, the individual identifies the individual based on the apparel worn by the individual and/or equipment used by the individual.

At 704, the entity determines, based on images of the individual, a facial expression of the individual. For example, the entity tracks the relative positions and/or movements of facial characteristics of the individual. In some cases, the entity determines a condition of the individual based on the facial expression. For example, the entity determines whether the individual is in pain, straining, is being attacked, or is exhibiting symptoms of a stroke.

At 706, the entity performs an action based on the facial expression. In some implementations, the entity generates an alert indicating the condition of the individual. The entity may transmit the alert to an external device. For instance, the entity generates an alert warning the individual about workplace injuries if the individual is a care provider observed to be in pain or straining. In some cases, the entity transmits, to a device used by a security office, an alert indicating that the individual is suspected of being attacked. According to some implementations, the entity generates an alert or message indicating that the individual is exhibiting symptoms of a stroke. The entity may transmit the alert to a device associated with a care provider, which may cause the care provider to provide assistance to the individual. In some cases, the entity updates the EMR of the individual based on the condition.

Figure 8:
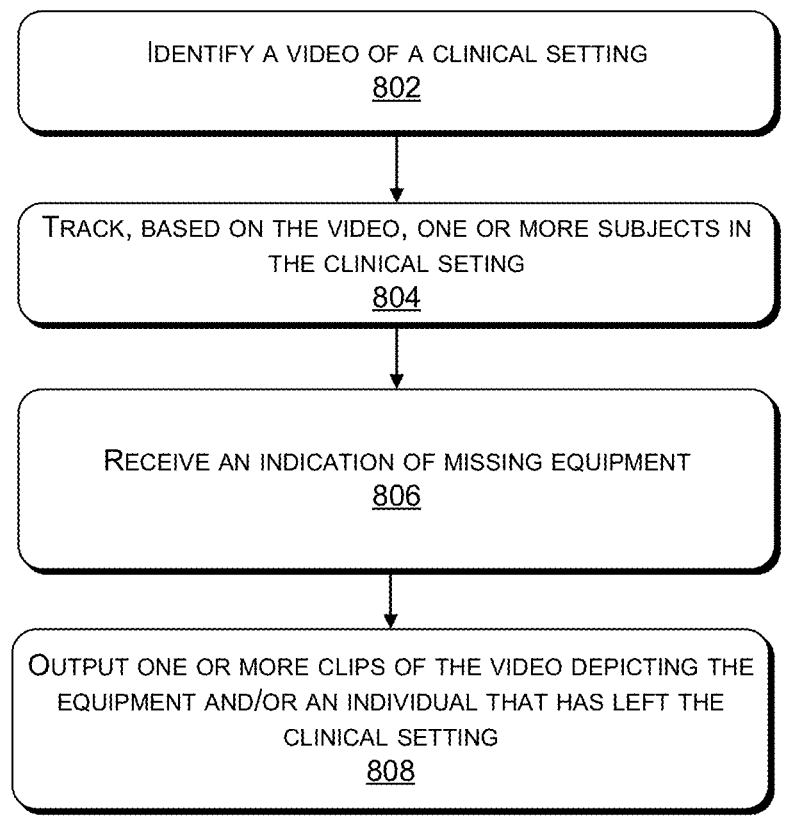
FIG. 8 illustrates an example process for providing assistance with locating missing equipment.

FIG. 8 illustrates an example process 800 for providing assistance with locating missing equipment. The example process 800 is performed by an entity including, for example, the image analysis system 114, a processor, and/or a computing device.

At 802, the entity identifies a video of a clinical setting. In some implementations, the clinical setting is a procedure room, such as an operating room, a catheterization laboratory, or other setting in which a trained care provider is configured to insert instruments into patient body cavities. The video may be captured via one or more cameras disposed in the clinical setting.

At 804, the entity tracks, based on the video, one or more subjects in the clinical setting. In various implementations, the subjects include equipment and/or individuals. The entity may identify equipment and individuals depicted in the video. In some cases, the entity generates and/or updates a log indexing the times and locations of the equipment and individuals over time based on the video. Various image-based and other recognition techniques described herein can be used by the entity to specifically identify the equipment and individuals depicted in the video. The entity may further store the video.

At 806, the entity receives an indication of missing equipment. For example, a care provider may enter an indication of the missing equipment (e.g., equipment that has been unaccounted for in an equipment count into a monitor or other device located in the clinical setting. The monitor may transmit a signal indicating the missing equipment to the entity. Based on the signal, the monitor may identify the times and/or locations of the missing equipment. In addition, the monitor may identify times at which individuals have left the clinical setting. For instance, the monitor may selectively identify times at which individuals left the clinical setting after the last time at which the missing equipment was detected in the video.

At 808, the entity outputs one or more clips of the video depicting the equipment and/or an individual that has left the clinical setting. In various implementations, the entity generates the clip based on the information in the log. For example, the entity generates a clip based on the time and the location that the missing equipment was last observed, such that the clip indicates the last time at which the missing equipment was observed. In some cases, the entity generates a clip based on the time at which an individual left the clinical setting. The clip, for example, may show the individual leaving the clinical setting. In some cases, the individual may have carried the equipment out of the clinical setting, such that the clip of the individual may indicate (to a user) that the missing equipment is no longer located in the clinical setting.

Figure 9:
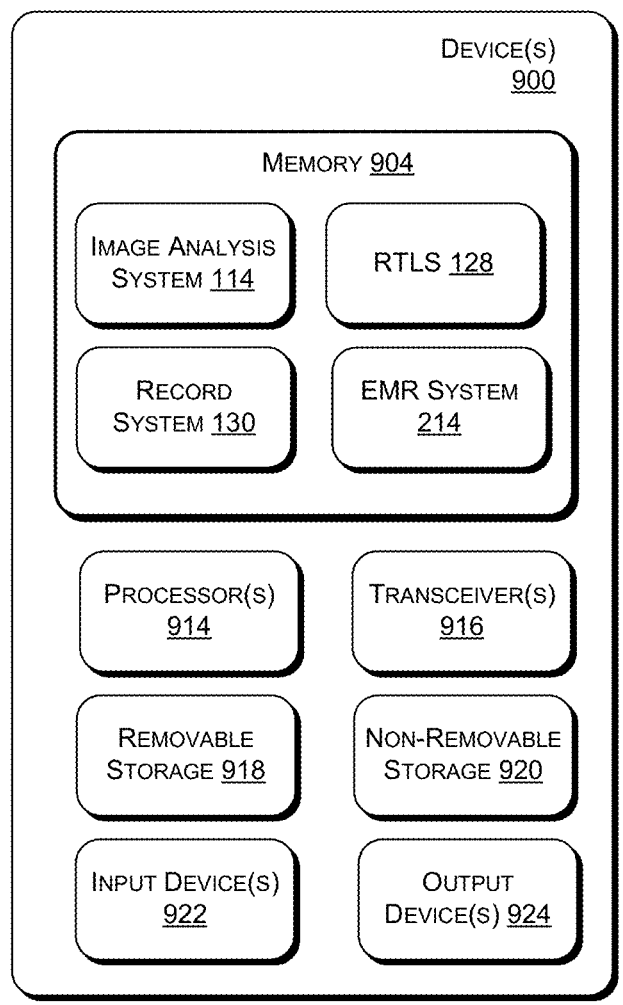
FIG. 9 illustrates at least one example device configured to enable and/or perform the some or all of the functionality discussed herein.

FIG. 9 illustrates at least one example device 900 configured to enable and/or perform the some or all of the functionality discussed herein. Further, the device(s) 900 can be implemented as one or more server computers 902, a network element on a dedicated hardware, as a software instance running on a dedicated hardware, or as a virtualized function instantiated on an appropriate platform, such as a cloud infrastructure, and the like. It is to be understood in the context of this disclosure that the device(s) 900 can be implemented as a single device or as a plurality of devices with components and data distributed among them.

As illustrated, the device(s) 900 comprise a memory 904. In various embodiments, the memory 904 is volatile (including a component such as Random Access Memory (RAM)), non-volatile (including a component such as Read Only Memory (ROM), flash memory, etc.) or some combination of the two.

The memory 904 may include various components, such as the image analysis system 114, the RTLS 128, the record system 130, and the EMR system 214. Any of the image analysis system 114, the RTLS 128, the record system 130, and the EMR system 214 can comprise methods, threads, processes, applications, or any other sort of executable instructions. The image analysis system 114, the RTLS 128, the record system 130, the EMR system 214, and various other elements stored in the memory 904 can also include files and databases.

The memory 904 may include various instructions (e.g., instructions in the image analysis system 114, the RTLS 128, the record system 130, and the EMR system 214), which can be executed by at least one processor 914 to perform operations. In some embodiments, the processor(s) 914 includes a Central Processing Unit (CPU), a Graphics Processing Unit (GPU), or both CPU and GPU, or other processing unit or component known in the art.

The device(s) 900 can also include additional data storage devices (removable and/or non-removable) such as, for example, magnetic disks, optical disks, or tape. Such additional storage is illustrated in FIG. 9 by removable storage 918 and non-removable storage 920. Tangible computer-readable media can include volatile and nonvolatile, removable and non-removable media implemented in any method or technology for storage of information, such as computer readable instructions, data structures, program modules, or other data. The memory 904, removable storage 918, and non-removable storage 920 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 900. Any such tangible computer-readable media can be part of the device(s) 900.

The device(s) 900 also can include input device(s) 922, such as a keypad, a cursor control, a touch-sensitive display, voice input device, etc., and output device(s) 924 such as a display, speakers, printers, etc. These devices are well known in the art and need not be discussed at length here. In particular implementations, a user can provide input to the device(s) 500 via a user interface associated with the input device(s) 922 and/or the output device(s) 924.

As illustrated in FIG. 9, the device(s) 900 can also include one or more wired or wireless transceiver(s) 916. For example, the transceiver(s) 916 can include a Network Interface Card (NIC), a network adapter, a LAN adapter, or a physical, virtual, or logical address to connect to the various base stations or networks contemplated herein, for example, or the various user devices and servers. To increase throughput when exchanging wireless data, the transceiver(s) 916 can utilize Multiple-Input/Multiple-Output (MIMO) technology. The transceiver(s) 916 can include any sort of wireless transceivers capable of engaging in wireless, Radio Frequency (RF) communication. The transceiver(s) 916 can also include other wireless modems, such as a modem for engaging in Wi-Fi, WiMAX, Bluetooth, or infrared communication.

In some implementations, the transceiver(s) 916 can be used to communicate between various functions, components, modules, or the like, that are comprised in the device(s) 900. For instance, the transceivers 916 may facilitate communications between the image analysis system 114, the RTLS 128, the record system 130, and the EMR system 214.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

Although the subject matter has been described in language specific to structural features and/or methodological acts, it is to be understood that the subject matter defined in the appended claims is not necessarily limited to the specific features or acts described.

What is claimed is:

1. A system, comprising:
a camera configured to capture images of a clinical setting;
at least one processor communicatively coupled to the camera;
an input device communicatively coupled to the at least one processor and configured to receive an input signal from a user, the input signal indicating an instrument;
a display communicatively coupled to the at least one processor; and
memory communicatively coupled to the at least one processor and storing:
an identity database comprising entries indicating features of care providers in the clinical setting;
instructions that, when executed by the at least one processor, cause the at least one processor to perform operations comprising:
identifying the instrument in a first set of the images;
identifying a facial feature of an individual in a second set of the images;
identifying a contextual feature of the individual, the contextual feature comprising at least one of apparel worn by the individual in the second set of the images, a voice of the individual, or a badge of the individual detected in the clinical setting;
identifying an entry among the entries based on the facial feature and the contextual feature based on the entry;
determining that the individual is a particular care provider among the care providers based on the entry;
determining, based on the second set of the images, a time at which the particular care provider has left the clinical setting; and
based on the input signal, outputting, on the display:
at least a portion of the first set of the images depicting the instrument;
an indication of the time at which the particular care provider has left the clinical setting; and
an identifier of the care provider.

2. The system of claim 1, wherein:
the images captured by the camera depict a threshold separating the clinical setting from an external setting; and
the time at which the particular care provider has left the clinical setting is determined by identifying when the particular care provider passes through the threshold.

3. The system of claim 1, wherein the instrument comprises at least one of a surgical tool, a medical device, a sponge, a lap pad, suture, a towel, an implantable device, a bandage, or a tray.

4. The system of claim 1, wherein identifying the instrument in the first set of the images comprises:
identifying an edge of an object depicting the instrument in the first set of images by detecting a discontinuity in brightness within the first set of images; and
identifying the instrument by comparing the edge of the object to a predetermined shape associated with the instrument.

5. The system of claim 1, wherein:
the at least portion of the first set of images comprises a particular image captured by the camera after the other first set of images, and
the time at which the care provider has left the clinical setting is after the time at which the particular image was captured.

6. A system, comprising:
a processor; and
memory communicatively coupled to the processor and storing instructions that, when executed by the processor, cause the processor to perform operations comprising:
identifying images of an individual;
determining, based on the images, a facial feature of the individual;
determining a contextual feature of the individual; and
determining, based on the facial feature and the contextual feature, an identity or a class of the individual.

7. The system of claim 6, wherein determining the identity of the individual comprises:
identifying, in a database, an entry indicating the facial feature and/or the contextual feature; and
determining an identifier of the individual stored in the entry.

8. The system of claim 6, wherein determining the identity of or the class of the individual comprises:
determining that the facial feature and/or the contextual feature is absent from the database; and
based on determining that the facial feature and/or the contextual feature is absent from the database, determining that the individual is a patient or a visitor.

9. The system of claim 6, wherein determining the identity of the individual comprises:
determining that the contextual feature is consistent with an electronic medical record (EMR) of a patient; and
determining that the individual is the patient.

10. The system of claim 6, wherein the facial feature comprises at least one of a variance between the face of the individual and a set of eigenfaces, a first distance between facial characteristics on the face of the individual, or a ratio of the first distance and a second distance between the facial characteristics on the face of the individual.

11. The system of claim 6, wherein determining the contextual feature comprises:
identifying, based on the images, at least one of an identification badge worn by the individual, a gown worn by the individual, a coat worn by the individual, a medical device monitoring the individual, personal protective equipment (PPE) worn by the individual, equipment utilized by the individual, or a barcode affixed to the individual.

12. The system of claim 6, wherein determining the contextual feature comprises:
receiving, from a real time location system (RTLS), an indication of a location of a badge detected in a setting depicted in the images.

13. The system of claim 6, wherein the operations further comprise:
identifying, based on the images, a facial expression of the individual;
determining, based on the facial expression, a condition of the individual, the condition comprising at least one of pain, straining, or a stroke; and
based on the condition of the individual, transmitting:
an alert instructing a care provider to provide assistance to the individual; or
an indication of the condition to an electronic medical record (EMR) system.

14. The system of claim 6, wherein the operations further comprise:
identifying, based on the images, a facial expression of the individual;
determining, based on the facial expression, that the individual is being attacked; and
based on determining that the individual is being attacked, transmitting an alert instructing a security officer to attend to the individual.

15. The system of claim 6, wherein the operations further comprise:
determining, based on the images, that the individual is incorrectly wearing personal protective equipment (PPE); and
transmitting, to an external device, a report indicating an identity of the individual and that the individual is incorrectly wearing the PPE.

16. The system of claim 6, wherein the operations further comprise:
determining, based on the images, a change in a movement of the individual;
determining a physical and/or neurological condition of the individual based on the change in the movement; and
transmitting a report indicating the physical and/or neurological condition of the individual.

17. A method, comprising:
capturing images depicting a clinical setting;
identifying, based on the images, equipment in the clinical setting;
storing, based on the images, an indication of a location of the equipment in the clinical setting;
receiving an indication that the equipment is unaccounted for; and
based on receiving the indication that the equipment is unaccounted for, outputting a signal indicating the location of the equipment.

18. The method of claim 17, wherein outputting the signal comprises:
causing at least one light emitter to illuminate the location of the equipment.

19. The method of claim 17, wherein outputting the signal comprises:
causing a monitor to visually display the indication of the location of the equipment.

20. The method of claim 17, wherein outputting the signal comprises:
causing a monitor to visually display at least one of the images depicting the location of the equipment.

* * * * *